US009450384B2

(12) United States Patent
Sharp

(10) Patent No.: US 9,450,384 B2
(45) Date of Patent: Sep. 20, 2016

(54) BREAKER-OPERATED ELECTRICAL CONNECTION SHUTTER FOR PANELBOARDS

(71) Applicant: SCHNEIDER ELECTRIC USA, INC., Palatine, IL (US)

(72) Inventor: Jeffrey O. Sharp, Murfreesboro, TN (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 14/578,474

(22) Filed: Dec. 21, 2014

(65) Prior Publication Data

US 2016/0181768 A1    Jun. 23, 2016

(51) Int. Cl.
*H02B 1/14* (2006.01)
*H02B 1/06* (2006.01)
*H02B 1/04* (2006.01)
*H01R 13/453* (2006.01)

(52) U.S. Cl.
CPC ............ *H02B 1/14* (2013.01); *H01R 13/4538* (2013.01); *H02B 1/04* (2013.01); *H02B 1/06* (2013.01)

(58) Field of Classification Search
CPC ........ H02B 11/24; H02B 11/04; H02B 1/36; H02B 1/21; H02B 1/04; H02B 1/06; H02B 1/14; H01R 13/4538
USPC .................................................. 361/627–658
See application file for complete search history.

(56) References Cited

U.S. PATENT DOCUMENTS

| 2,530,548 | A |   | 12/1950 | Stanley |           |
|-----------|---|---|---------|---------|-----------|
| 3,404,315 | A |   | 10/1968 | Jacobs et al. | |
| 4,285,026 | A |   | 8/1981  | Clausing |          |
| 4,667,268 | A | * | 5/1987  | Mrowka  | H02B 1/056 |
|           |   |   |         |         | 174/138 F |
| 4,916,574 | A | * | 4/1990  | Hancock | H02B 1/21 |
|           |   |   |         |         | 174/149 B |
| 5,272,591 | A | * | 12/1993 | Blue    | H02B 1/06 |
|           |   |   |         |         | 361/622   |

(Continued)

FOREIGN PATENT DOCUMENTS

| WO | 9737409    | 10/1997 |
|----|------------|---------|
| WO | 2014/209317 | 12/2014 |
| WO | 2015/047371 | 4/2015  |

OTHER PUBLICATIONS

PCT Search Report for PCT Application No. PCT/US13/48128 dated Dec. 3, 2013.

(Continued)

*Primary Examiner* — Zachary M Pape
(74) *Attorney, Agent, or Firm* — Locke Lord LLP

(57) ABSTRACT

Method and apparatus for minimizing exposure to live parts in the panelboard allow safe insertion and removal of a circuit breaker from the panelboard. The method and apparatus provide a shutter assembly that automatically closes off access to conductors in the panelboard until a circuit breaker is inserted in the panelboard. Inserting the circuit breaker in the panelboard causes the shutter assembly to open and allow the circuit breaker to contact the conductors. When the circuit breaker is removed from the panelboard, access to the conductors is automatically closed off again. Such a shutter assembly allows operators to safely insert and remove a circuit breaker and other electrical device from the panelboard.

13 Claims, 7 Drawing Sheets

(56) References Cited

U.S. PATENT DOCUMENTS

| | | | | |
|---|---|---|---|---|
| 5,272,592 A | * | 12/1993 | Harris | H02B 1/20 361/637 |
| 5,761,026 A | * | 6/1998 | Robinson | H02B 1/056 200/303 |
| 6,472,605 B1 | * | 10/2002 | Griffith | H02B 1/056 174/101 |
| 7,005,590 B1 | | 2/2006 | Willis | |
| 7,064,641 B2 | * | 6/2006 | Rowe | H02B 11/24 200/50.22 |
| 8,223,475 B2 | | 7/2012 | Baird et al. | |
| 8,333,600 B2 | | 12/2012 | Yanniello | |
| 2008/0087536 A1 | | 4/2008 | Besana et al. | |
| 2010/0238611 A1 | | 9/2010 | Deboer et al. | |
| 2012/0228095 A1 | | 9/2012 | Kutsche | |
| 2013/0048477 A1 | * | 2/2013 | Rahn | H02B 1/0565 200/50.24 |
| 2013/0140915 A1 | | 6/2013 | Spitaels et al. | |

OTHER PUBLICATIONS

PCT Search Report for PCT Application No. PCT/US13/62552 dated Feb. 17, 2014.

EP European Patent Search Report from EP Application No. EP15201436 dated May 3, 2016.

* cited by examiner

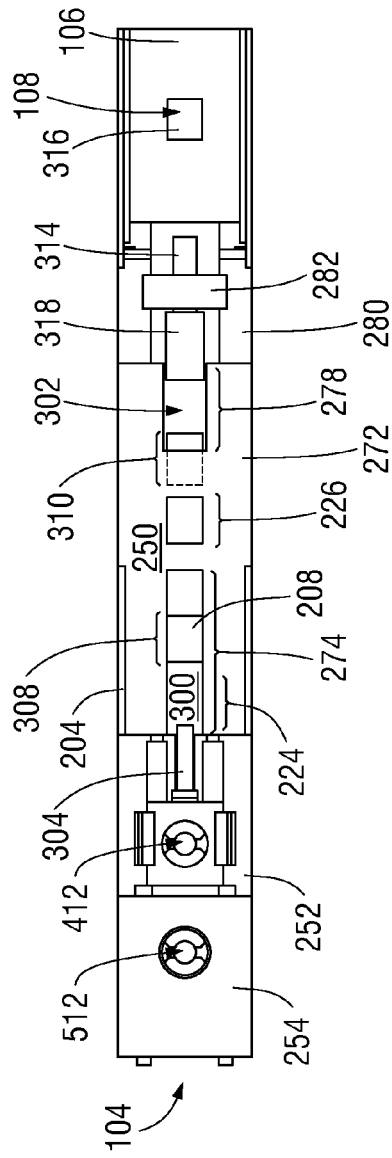
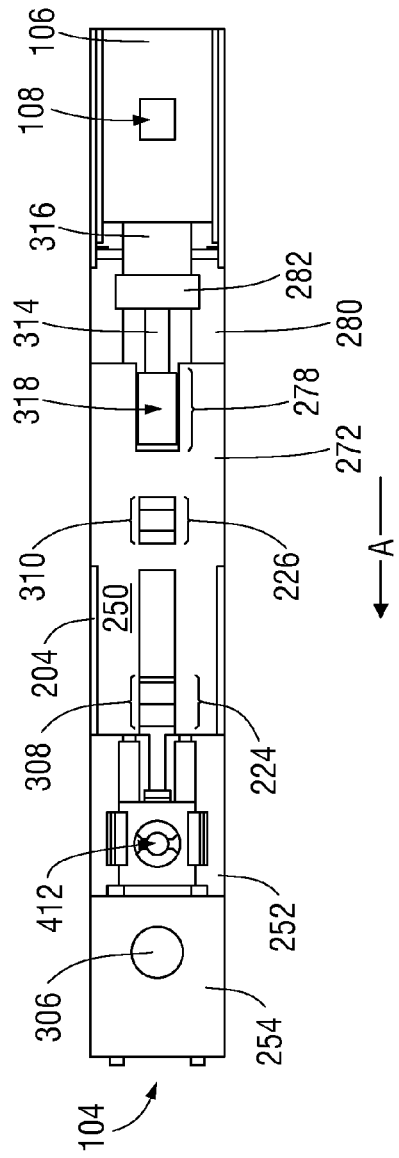
FIG. 8A
FIG. 8B

BREAKER-OPERATED ELECTRICAL CONNECTION SHUTTER FOR PANELBOARDS

FIELD OF THE INVENTION

The present disclosure relates to methods and systems for inserting and removing a circuit breaker from an electrical panel or panelboard, and more particularly to a method and apparatus for reducing the chances of exposure to live parts in the panelboard.

BACKGROUND OF THE INVENTION

An electrical panel or panelboard has a main bus and individual connection points on the bus that are connectable to electrical devices, such as circuit breakers for branch conductors and any other electrical devices designed to be installed for a branch circuit. Because the circuit breakers and other branch electrical devices are typically mounted directly to the panelboard, an operator and/or tools may come in contact with exposed conductors in the panelboard when installing or removing the circuit breakers from the panelboard. Thus, it is recommended that power be shut off to the panelboard as a precaution when electrical devices are being installed or removed. However, it may be considered desirable in some cases to keep the panelboard energized to prevent an electrical hazard as a consequence of deenergization, or operators may intentionally keep the power on in the interest of saving time. Moreover, shutting off power to the panelboard can be a major inconvenience, especially for data centers, hospitals, and other critical applications that require a high availability power source.

Thus, a need exists for an improved way to safely insert and remove a circuit breaker or other switching equipment from an electrical panel as part of a larger scheme for installing and removing branch circuit devices without deenergizing the electrical panel.

SUMMARY OF THE DISCLOSED EMBODIMENTS

The embodiments disclosed herein are directed to methods and systems for reducing the possibility of exposure to live parts in a panelboard and safely installing and removing a circuit breaker or other branch electrical devices from the panelboard. The disclosed embodiments provide a shutter assembly for the panelboard that automatically closes off access to the conductors in the panelboard until a circuit breaker is inserted in the panelboard. The shutter assembly is attachable to the panelboard in a circuit breaker mounting slot and serves as a protective interface for the panelboard. The circuit breaker is designed so that inserting it in the panelboard opens the shutter assembly and allows the circuit breaker to access the conductors in the panelboard. When the circuit breaker is removed from the panelboard, the shutter assembly again closes off access to the conductors. Such a shutter assembly allows operators to safely insert and remove a circuit breaker and other electrical device from the panelboard while also minimizing the potential for exposure to live parts in the panelboard.

In some implementations, the shutter assembly may be composed of several components, including a channel-shaped shutter housing, a shutter plate slidably disposed longitudinally within the shutter housing, and a slide cover that may be snapped on to secure the shutter plate to the shutter housing. The shutter housing has substantially the same length and width as a circuit breaker and also includes a snap-on or other attachment mechanism that allows the shutter assembly to be snapped on or otherwise attached to the panelboard in a breaker slot thereof. Openings are provided within the shutter housing, shutter plate, and slide cover to allow contact terminals protruding from the bottom of the circuit breaker, including load, line, and neutral terminals, to connect to the conductors in the panelboard. When the shutter plate is in a closed position, the openings in the shutter plate are offset from the openings in shutter housing and cover such that the shutter plate blocks access to the conductors in the panelboard. Inserting the circuit breaker in the panelboard forces the shutter plate to slide from the closed position into an open position where the openings in the shutter plate are substantially aligned with the openings in the shutter housing and cover, thereby allowing the terminals of the circuit breaker to contact the conductors in the panelboard.

In some implementations, the circuit breaker may have a shutter actuator resembling a ridge or strip protruding from an outer casing of the circuit breaker, for example, from a front wall thereof. This shutter actuator lines up with a drive member on the shutter plate and pushes on the drive member when the circuit breaker is inserted in the panelboard. The drive member may resemble a stab or stump extending upward from the shutter plate and may have a sloped or beveled surface on one side that faces toward the shutter actuator. When the circuit breaker is inserted into the panelboard, the motion of the circuit breaker going into the panelboard causes the shutter actuator to contact and push down on the beveled surface. This drives the shutter plate forward, causing it to slide from the closed position to the open position. A spring or other biasing mechanism may be coupled to the shutter plate to return the shutter plate back to the closed position when the circuit breaker is removed from the panelboard.

In some implementations, the shutter assembly disclosed herein may include a load lug assembly having a load lug therein that is connected to the circuit breaker when the circuit breaker is installed in the panelboard. A load wire may then be connected to the load lug rather than directly to the circuit breaker, although a direct connection to the circuit breaker is certainly possible in alternative implementations. Such a load lug assembly may be disposed in the shutter housing on a load side thereof, or the side proximate to the load. The load lug assembly may have an opening through which the load lug may be accessed and a lug extension that connects the load lug to the circuit breaker when the circuit breaker is installed in the panelboard. The opening in the load lug assembly may be protected by a load lug shield on the shutter plate that covers up the opening when the circuit breaker is installed in the panelboard. Moving the shutter plate into the closed position causes the load lug shield to slide over the load lug assembly to thereby block access to the load lug. When the circuit breaker is removed from the panelboard, the load lug shield is slid back away from the load lug assembly to uncover the load lug.

In some implementations, the shutter assembly may further include a neutral lug assembly having a neutral lug disposed therein that is connected to the circuit breaker when the circuit breaker is installed in the panelboard. A neutral wire may then be connected to the neutral lug rather than directly to the circuit breaker, although a direct connection to the circuit breaker is certainly possible in other implementations. As with the load lug assembly, the neutral lug assembly may be disposed on the shutter housing on the side proximate to where the loads will be. For example, the neutral lug assembly may be disposed on a support tower on top of the slide cover of the shutter assembly. And like the load lug assembly, the neutral lug assembly may have an opening through which the neutral lug may be accessed. When the circuit breaker is inserted in the panelboard, the neutral lug is connected to contact jaws protruding from the outer casing of the circuit breaker, for example, from a front wall thereof directly above the shutter actuator. These conductive contact jaws are connected to the neutral terminal of the circuit breaker by virtue of a direct internal connection running through the circuit breaker. A hood may be provided on the outer casing of the circuit breaker that overhangs the contact jaws such that when the circuit breaker is inserted in the panelboard, the hood covers up the neutral lug assembly and blocks access to the neutral lug. When the circuit breaker is removed from the panelboard, the neutral lug assembly is uncovered and the neutral lug accessible again.

In general, in one aspect, the disclosed embodiments are directed to a shutter assembly for an electrical panelboard. The shutter assembly comprises, among other things, a shutter housing mountable over a breaker slot in the panelboard, the shutter housing including openings therein that allow access to conductors in the panelboard when the shutter housing is mounted over the breaker slot in the panelboard. The shutter assembly further comprises a shutter plate disposed within the shutter housing and slidable longitudinally between a closed position and an open position. The shutter plate includes openings therein that substantially align with the openings in the shutter housing to provide access to the conductors in the panelboard. When the shutter plate is in the closed position, the openings in the shutter plate are offset from the openings in the shutter housing to block access to the conductors in the panelboard. When the shutter plate is in the open position, the openings in the shutter plate are substantially aligned with the openings in the shutter housing to allow access to the conductors in the panelboard.

In general, in another aspect, the disclosed embodiments are directed to a panelboard for electrical distribution equipment. The panelboard comprises, among other things, a breaker slot in the panelboard, the breaker slot providing access to conductors in the panelboard, and a shutter assembly in the panelboard, the shutter assembly disposed over the breaker slot and movable between a closed position in which the shutter assembly blocks access to the conductors in the panelboard and an open position in which the shutter assembly allows access to the conductors in the panelboard. Inserting a circuit breaker in the panelboard automatically puts the shutter assembly in the open position and removing the circuit breaker from the panelboard automatically puts the shutter assembly in the closed position.

BRIEF DESCRIPTION OF THE DRAWINGS

The foregoing and other advantages of the disclosed embodiments will become apparent upon reading the following detailed description and upon reference to the drawings, wherein:

FIGS. 8A-8B show the exemplary shutter assembly in closed and open positions, respectively, according to one or more embodiments disclosed herein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
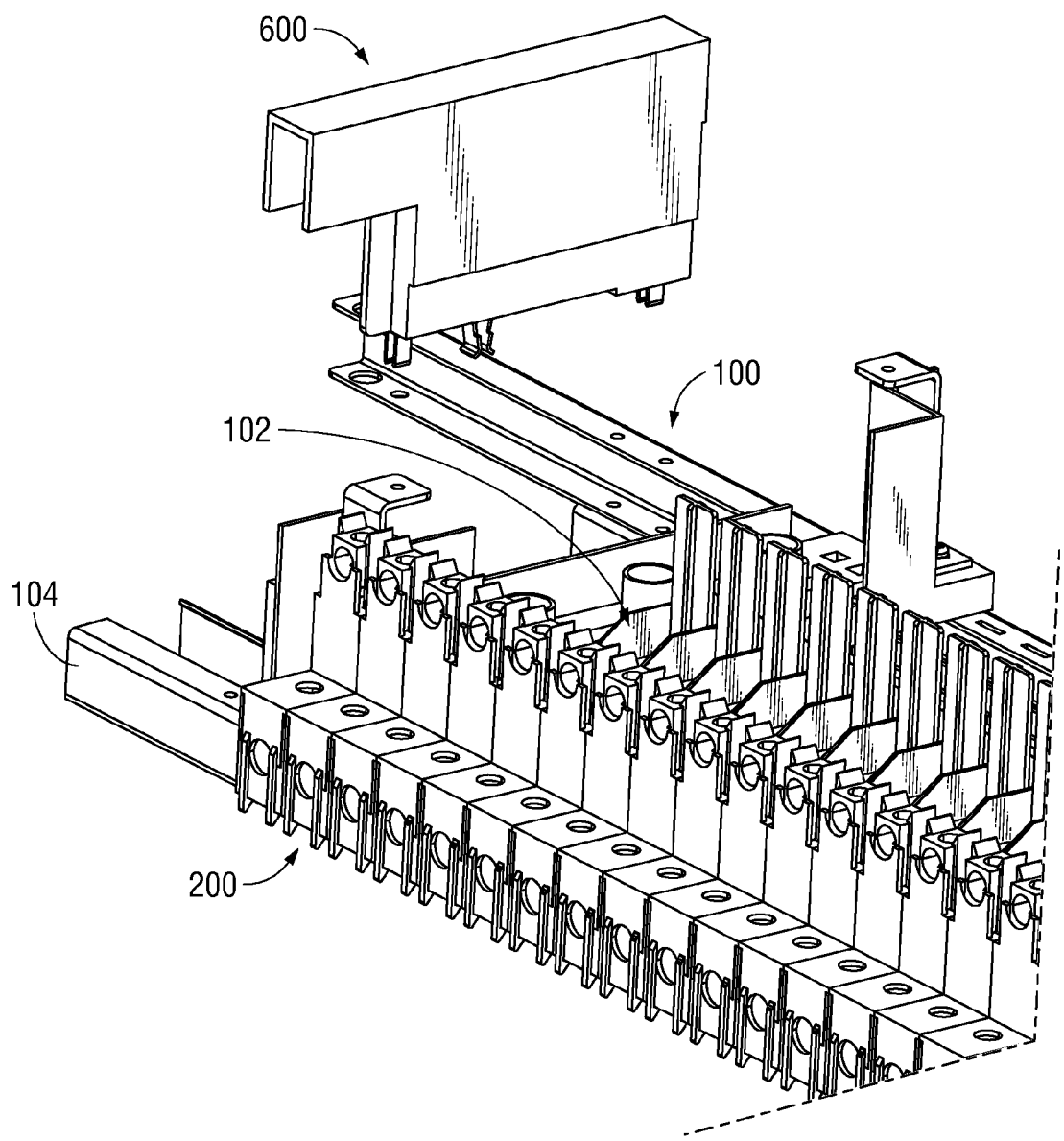
FIG. 1 shows an exemplary panelboard having a shutter assembly according to one or more embodiments disclosed herein.

Referring now to FIG. 1, a panelboard 100 is shown according to the disclosed embodiments. As is typically done, the panelboard 100 provides a plurality of circuit breaker mounting slots, one of which is indicated at 102, in which circuit breakers, one of which is indicated at 600, may be mounted in order to connect to conductors (not expressly shown) in the panelboard 100. However, instead of being mounted to the panelboard 100 directly, each circuit breaker 600 (detailed in FIG. 6) is mounted to the panelboard 100 through a shutter assembly 200 that may be attached to the panelboard 100 in one of the breaker slots 102 of the panelboard. The shutter assembly 200 serves to block external access to the conductors in the panelboard 100 unless and until the circuit breaker 600 is inserted in the panelboard. The circuit breaker 600 is designed so that inserting it automatically opens the shutter assembly 200 and allows the circuit breaker terminals to contact the conductors in the panelboard. Removing the circuit breaker 600 automatically closes the shutter assembly 200 to again block access to the conductors. And of course, when the circuit breaker 600 is installed in the panelboard 100, the circuit breaker 600 itself blocks any external access to the conductors in the panelboard.

The ability to attach the shutter assembly 200 to the panelboard 100 advantageously allows the shutter assembly 200 to be installed as needed (e.g., in the field) rather than, for example, requiring the panelboard 100 to be factory assembled with shutter assemblies. In addition, in some embodiments, the shutter assembly 200 may also include protected load wire and neutral wire connection points or lugs to which load wires and neutral wires may be connected. Any load wires and neutral wires may then be connected to the connection points on the shutter assembly 200 rather than directly to the circuit breaker 600 in these embodiments. Inserting the circuit breaker 600 in the shutter assembly 200 (and hence into the panelboard) automatically connects the circuit breaker 600 terminals to these connection points (and hence to the load and neutral wires) while blocking external access to the connection points. Conversely, the shutter assembly 200 allows access to the load wire and neutral wire connection points when there is no circuit breaker 600 mounted.

Figure 2:
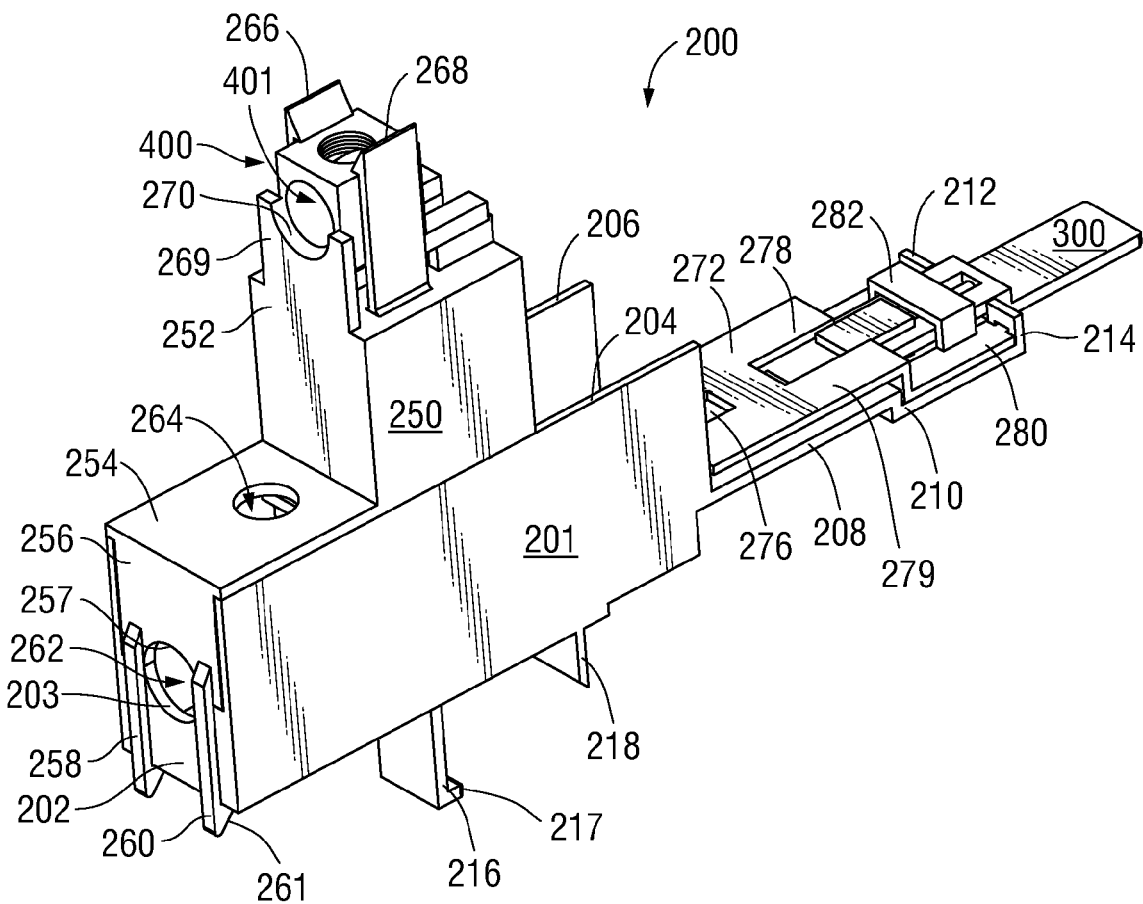
FIG. 2 shows an exemplary shutter assembly according to one or more embodiments disclosed herein.
Figure 4:
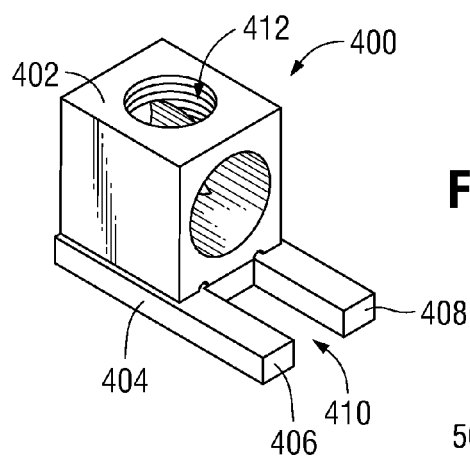
FIG. 4 shows an exemplary neutral lug assembly for the shutter assembly according to one or more embodiments disclosed herein.
Figure 5:
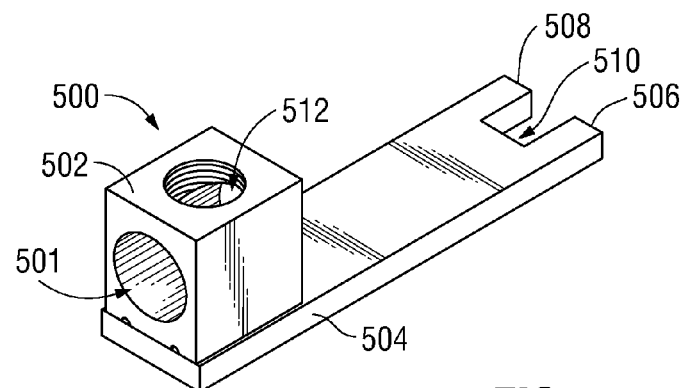
FIG. 5 shows an exemplary load lug assembly for the shutter assembly according to one or more embodiments disclosed herein.

FIG. 2 shows the shutter assembly 200 in its assembled form according to one or more disclosed embodiments. As can be seen, the shutter assembly 200 has several main components, including a channel-shaped shutter housing 201, a shutter plate 300 slidably disposed longitudinally within the shutter housing 201, and a snap-on slide cover 250 that retains the shutter plate 300 within the shutter housing 201. These components of the shutter assembly 200 are also shown separately in FIGS. 3A-3C for ease of viewing. A neutral lug assembly 400, detailed in FIG. 4, is mounted on top of the slide cover 250 for receiving a neutral wire, and a load lug assembly 500, detailed in FIG. 5, is mounted within the shutter assembly 200 for receiving a load wire. Such a shutter assembly 200 may then be attached to the panelboard 100 in one of the breaker slots 102 and a circuit breaker 600 inserted in the shutter assembly 200 to connect the circuit breaker 600 to the panelboard 100.

Referring still to FIG. 2, the shutter housing 201 has nearly the same length and width as the circuit breaker 600 and may be composed of several sections, including a front wall 202 having a semicircular slot 203 formed therein, two parallel sidewalls 204 and 206 extending back at right angles from the sides of the front wall 202, and a base plate 208 interconnecting the two sidewalls 204, 206 that forms the bottom of the shutter housing 201. The base plate 208 runs back from the front wall 202 past the two sidewalls 204, 206 and drops off to a step-down portion 210 near the opposite end. Tabs 212 and 214, one tab on each side of the base plate 208, facilitate mounting the slide cover 250 to the shutter housing 201. The tabs 212, 214 sit upright perpendicularly to the base plate 208 and have small holes or notches (not visible here) for receiving corresponding mounting tabs 284 and 286 (FIG. 3A) on the slide cover 250. The shutter plate 300 may then be slidably disposed within the shutter housing 201 between the slide cover 250 and the base plate 208. Legs 216 and 218 or similar structures may be provided under the base plate 208 to facilitate attaching the shutter assembly 200 to a mounting rail 104 (FIG. 1) of the panelboard 100. One of the legs, for example, the first leg 216, may have a lip 217 or similar retention feature for securing the shutter assembly 200 to the mounting rail 104 of the panelboard 100.

As noted above, the slide cover 250 snaps on over the shutter housing 201 and, like the shutter housing 201, may have several sections, including a front plate 256 having a semicircular slot 257 formed therein and two parallel legs 258 and 260 extending down from the front plate 256. The semicircular slot 257 defines a load wire portal 262 with the semicircular slot 203 of the shutter housing 201 through which a load wire may be passed into the shutter assembly 200. The two parallel legs 258, 260 each have a hook feature 261 at the ends thereof that allows the slide cover 250 to be snapped on to the shutter housing 201. A top plate 254 extends back from the front plate 256 substantially perpendicular thereto (i.e., horizontally). The top plate 254 has a load lug access portal 264 formed near its middle through which a load lug assembly (see FIG. 3B) within the shutter assembly 200 may be accessed. A neutral lug support structure 252 projects upward from the top plate 256 to provide an elevated platform on which to mount the neutral lug assembly 400. The neutral lug support structure 252 may have mounting clips, two of which are shown here at 266 and 268 protruding upward from the top of the neutral lug support structure 252 for securing the neutral lug assembly 400 therein. A shield plate 269 having a semicircular slot 270 cut therefrom may also protrude upward from the load side (i.e., the side facing the load) of the neutral lug support structure 252 to block access to the neutral lug assembly 400. The semicircular slot 270 in the shield plate 269 is coextensive with a neutral wire portal 401 of the neutral lug assembly 400 for allowing a neutral wire to be passed into the neutral lug assembly 400. The remaining details of the slide cover 250 are described with respect to FIG. 3A.

Figure 3A:
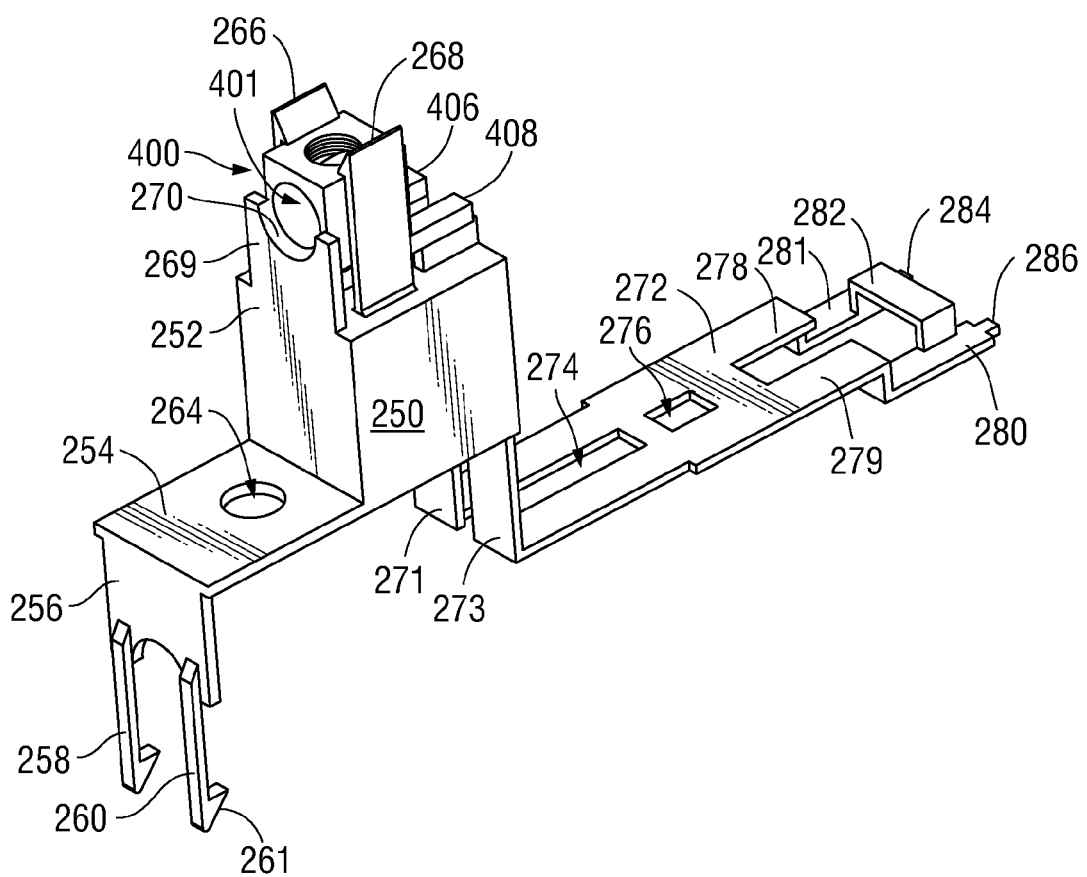
FIGS. 3A-3C show an exemplary slide cover, shutter housing, and shutter plate for a shutter assembly according to one or more embodiments disclosed herein.

Referring now to FIG. 3A, the slide cover 250 further includes two vertical prongs 271 and 273 extending downward from the other side of the neutral lug support structure 252 (i.e., the side away from the load). The two vertical prongs 271, 273 transition into two horizontal prongs 278 and 279, respectively, that define therebetween a load terminal slot 274 where a load terminal 602 of the circuit breaker 600 (FIG. 6) may be inserted. A bridge section 272 bridges the two horizontal prongs 278, 279 near the middle thereof. The bridge section 272 defines therein a neutral terminal slot 276 in which a neutral terminal 604 of the circuit breaker 600 (FIG. 6) may be inserted. The two horizontal prongs 278, 279 drop off to form step-down portions 280 and 281, respectively, near the ends of the horizontal prongs 278, 279. The step-down portions 280, 281 correspond to the step-down portion 210 of the shutter housing 201 mentioned previously. A retention brace 282 connects the two step-down portions 280, 281 together near the mounting tabs 284, 286 and operates to retain the shutter plate 300 in the shutter housing 201.

Figure 3B:
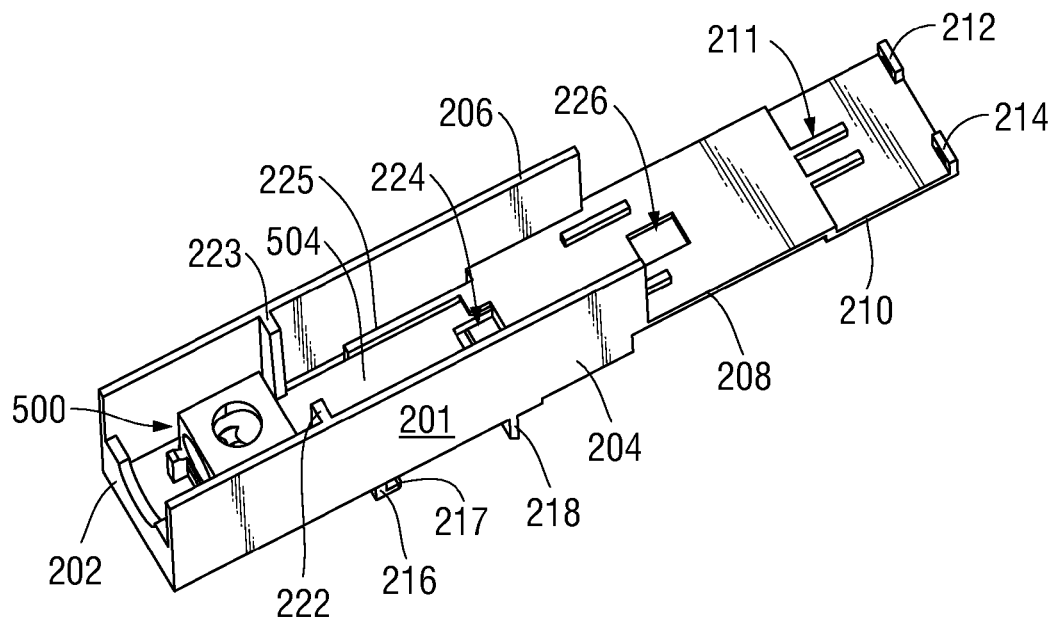

The shutter housing 201 can be seen in more detail in FIG. 3B. As this figure shows, several openings are provided in the baseplate 208, including a load terminal opening 224 and a neutral terminal opening 226. The load terminal opening 224 is positioned to receive the load terminal 602 of the circuit breaker 600 and the neutral terminal opening 226 is positioned to receive the neutral terminal 604 of the circuit breaker 600 when the circuit breaker 600 is mounted in the shutter assembly 200. The step down portion 210 of the shutter housing 201 is designed to accommodate a spring or other similar mechanism for biasing the shutter plate 300 in the closed position. To this end, the baseplate 208 may be provided with a spring guide 211 that resembles a pair of parallel ridges extending out over the step down portion 210 between which the spring may be disposed. Spacers 222 and 223 may also be seen in this view extending inward perpendicularly from the sidewalls 204 and 206, respectively, for centering the shutter plate 300 within the shutter housing 201. The spacers 222, 223, along with a set of internal guides, one of which may be seen here at 225, also serve to center the load lug assembly 500, specifically a load lug extension plate 504 (FIG. 5) therein, within the shutter housing 201. The load lug extension plate 504 extends up to the load terminal opening 224 and electrically connects a load lug in the load lug assembly 500 to the load terminal 602 of the circuit breaker 600 when the circuit breaker 600 is mounted in the shutter assembly 200.

Figure 3C:
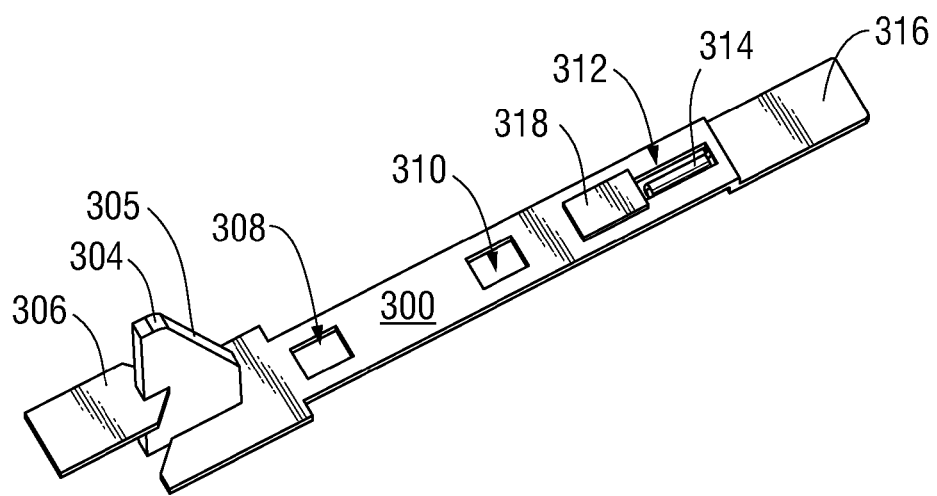

FIG. 3C shows the shutter plate 300 in more detail. As can be seen, the shutter plate 300 resembles an elongated rectangular plate that has several openings formed therein. The openings include a load terminal opening 308 through which the load terminal 602 of the circuit breaker 600 may pass and a neutral terminal opening 310 through which the neutral terminal 604 of the circuit breaker 600 may pass when the circuit breaker 600 is mounted in the shutter assembly 200. A drive member 304 resembling a stab or stump or blade like structure is provided at one end of the shutter plate 300, for example, the end closest to the load terminal opening 308. The drive member 304 projects upward from the shutter plate 300 and may have a sloped or beveled surface 305 on one side, for example, the side adjacent the load terminal opening 308. The other side of the drive member 304 may have a load lug shield 306 extending perpendicularly therefrom that is positioned and oriented to cover up the load lug access portal 501 in the load lug assembly 500 when the circuit breaker 600 is mounted on the shutter assembly 200. Also present on the shutter plate 300 is a slide stop 318 that works in cooperation with the bridge section 272 of the slide cover 250 to limit how far the shutter plate 300 may slide. A spring slot 312 is provided on the shutter plate 300 in which a spring 314 or other biasing member may be disposed for returning the shutter plate 300 to a default closed position. The other end of the shutter plate 300 (i.e., the end opposite the drive member 304) drops off to form a line cover section 316 that blocks access to a line terminal opening 108 (FIGS. 8A-8B) in the panelboard 100 until insertion of the circuit breaker 600 into the shutter assembly 200 puts the shutter plate 300 into an open position.

FIGS. 4 and 5 show the neutral lug assembly 400 and the load lug assembly 500, respectively, in accordance with the disclosed embodiments. Referring first to FIG. 4, the neutral lug assembly 400 includes a neutral lug (not expressly shown) housed within a neutral lug housing 402 that rests on an electrically conductive neutral lug extension plate 404. The neutral lug extension plate 404 has two contact arms 406 and 408 extending beyond the neutral lug housing 402 to define a neutral terminal port 410 therebetween. When the circuit breaker 600 is mounted on the shutter assembly 200, the neutral terminal 604 of the circuit breaker 600 fits within the neutral terminal port 410 between the two contact arms 406, 408, which connect a standoff neutral terminal 608 of the circuit breaker 600 to the neutral lug. A neutral wire may be connected to the neutral lug via the neutral wire portal 401 (see FIG. 2), and a neutral lug access portal 412 in the top of the neutral lug housing 402 provides access to the neutral lug.

The load lug assembly 500 is conceptually similar to the neutral lug assembly 400, as can be seen in FIG. 5. There is again a load lug housing 502 for housing a load lug (not expressly shown) to which a load wire may be attached. The load lug housing 502 rests on a load lug extension plate 504 that extends beyond the load lug housing 502 and terminates in two contact arms 506 and 508. The contact arms 506, 508 define a load terminal port 510 therebetween that is sized to receive the load terminal 602 of the circuit breaker 600 when the circuit breaker is mounted on the shutter assembly 200. These contact arms 506, 508 connect the load terminal 602 of the circuit breaker 600 to the load lug when the circuit breaker 600 as mounted on the shutter assembly 200. A load wire may be connected to the load lug via a load wire portal 501, and a load lug access portal 512 in the top of the load lug housing 502 allows access to the load lug.

Figure 6:
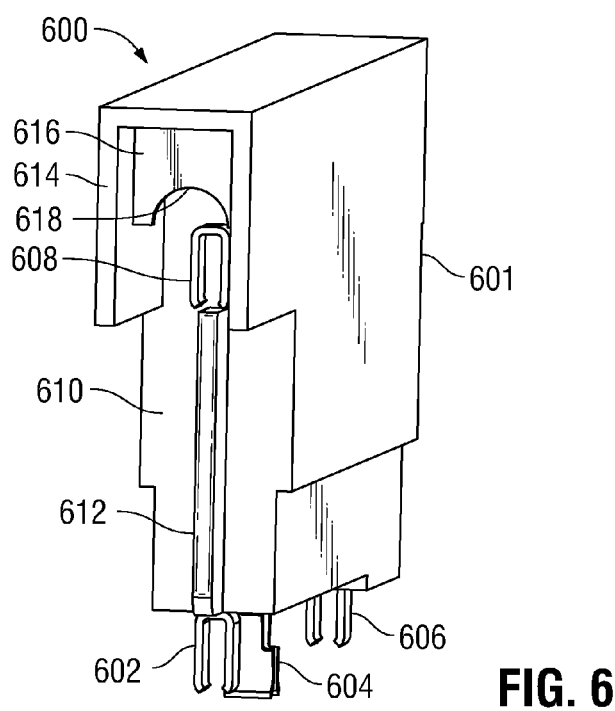
FIG. 6 shows an exemplary circuit breaker for the shutter assembly according to one or more embodiments disclosed herein.

The circuit breaker 600 is depicted in FIG. 6 according to one or more of the disclosed embodiments. As this figure shows, the circuit breaker 600 has an outer casing 601 from underneath which protrude several jaw like terminals, including the load terminal 602 and neutral terminal 604 mentioned above and a line terminal 606. The standoff neutral terminal 608 mentioned earlier is located on the front side 610 of the casing 601 above a shutter actuator 612 that resembles a vertical ridge or strip protruding from the casing 601. Although not expressly shown, the standoff neutral terminal 608 is electrically connected to the main neutral terminal 604 via wiring internal to the casing 601. An overhang 614 extends from the front side 610 of the casing 601 down to near the shutter actuator 612. The overhang 614 blocks access to the neutral lug access portal 401 of the neutral lug assembly 400 (FIG. 4) when the circuit breaker 600 is mounted on the shutter assembly 200. A guard plate 616 having a semicircular slot 618 cut therefrom is recessed within the overhang 614. The guard plate 616 rests on top of the shield plate 269 of the slide cover 250 when the circuit breaker 600 is mounted on the shutter assembly 200, with the semicircular slot 618 and the semicircular slot 270 in the shield plate 269 forming an opening to accommodate a neutral wire.

Figure 7:
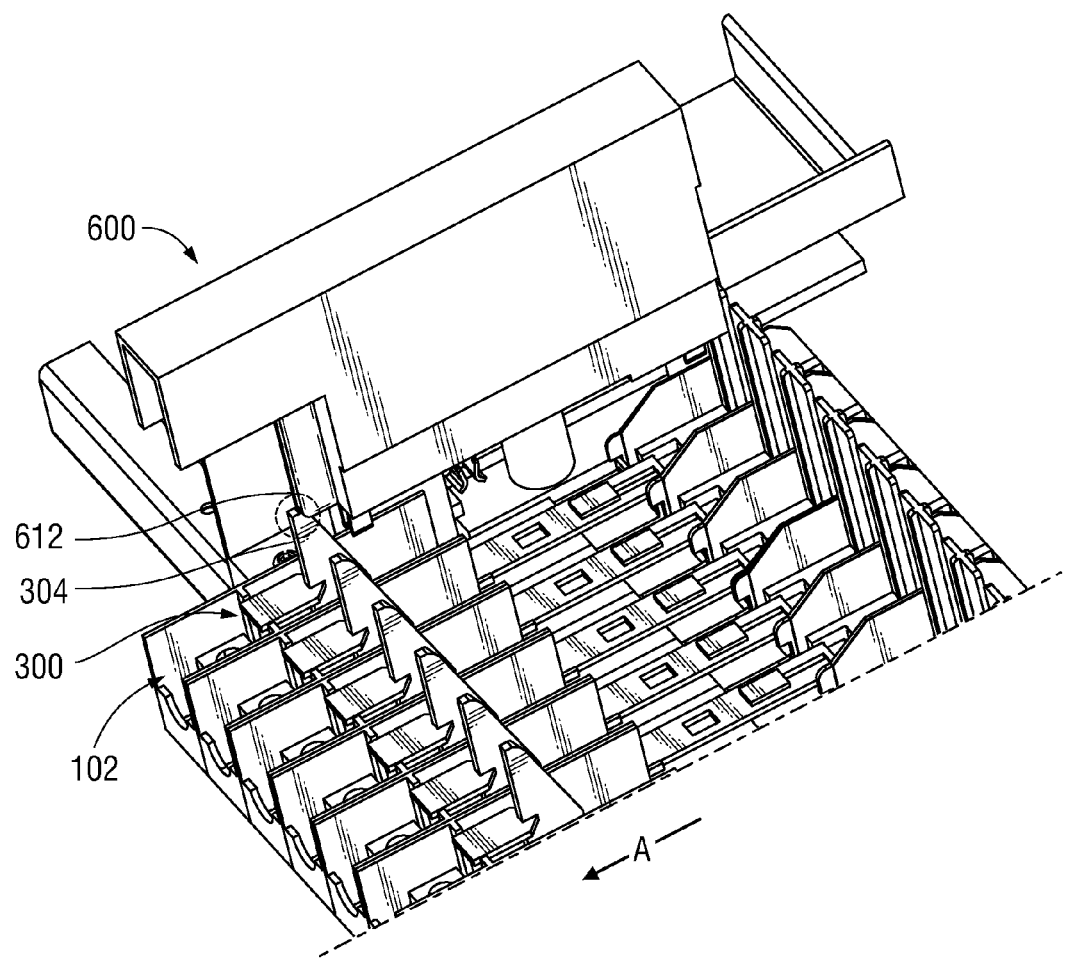
FIG. 7 shows insertion of the exemplary circuit breaker in the shutter assembly according to one or more embodiments disclosed herein.

In general operation, when the circuit breaker 600 is inserted into the panelboard 100, the downward motion of the circuit breaker 600 causes the shutter actuator 612 to contact and push down on the drive member 304 of the shutter plate 300, as can be seen in the dashed line circle in FIG. 7. The contact by the shutter actuator 612 drives the shutter plate 300 forward, indicated by the arrow labeled "A," causing the shutter plate 300 to slide from a closed position where the openings in the shutter plate 300 are offset from the openings in shutter housing 201 and slide cover 250, to an open position where the openings in the shutter plate 300 are substantially aligned with the openings in the shutter housing 201 and slide cover 250, thereby allowing the terminals of the circuit breaker 600 to contact the conductors in the panelboard 100.

The closed and open positions of the shutter plate 300 are depicted in FIGS. 8A and 8B, respectively. As can be seen in FIG. 8A, the closed position results in the load terminal opening 308 and neutral terminal opening 310 in the shutter plate 300 being misaligned with the load terminal opening 224 and the neutral terminal opening 226 in the base plate 208. As well, the line cover section 316 of the shutter plate 300 blocks access to the line terminal opening 108 in the line cover 106 of the panelboard 100 at this time. On the other hand, the load lug access portal 512 of the load lug assembly 500 is unblocked at this time, as is the neutral lug access portal 412 of the neutral lug assembly 400. Moving the shutter plate 300 into the open position, as portrayed in FIG. 8B, aligns the load terminal opening 308 and neutral terminal opening 310 in the shutter plate 300 with the load terminal opening 224 and the neutral terminal opening 226 in the base plate 208, unblocks the line terminal opening 108 in the line cover 106, and causes the load lug shield 306 of the shutter plate 300 to block the load lug access portal 512. This allows the load terminal 602, neutral terminal 604, and line terminal 606 of the circuit breaker 600 to access and contact the conductors in the panelboard 100.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A shutter assembly for an electrical panelboard, comprising:
   a shutter housing mountable over a breaker slot in the panelboard, the shutter housing including openings therein that allow access to conductors in the panelboard when the shutter housing is mounted over the breaker slot in the panelboard; and
   a shutter plate disposed within the shutter housing and slidable longitudinally between a closed position and an open position, the shutter plate including openings therein that substantially align with the openings in the shutter housing to provide access to the conductors in the panelboard;
   wherein when the shutter plate is in the closed position, the openings in the shutter plate are offset from the openings in the shutter housing to block access to the conductors in the panelboard, and when the shutter plate is in the open position, the openings in the shutter plate are substantially aligned with the openings in the shutter housing to allow access to the conductors in the panelboard.

2. The shutter assembly of claim 1, wherein the shutter housing includes a load lug assembly having an opening through which a load lug may be accessed and the shutter plate includes a load lug shield that automatically covers the opening on the load lug assembly when the shutter plate is in the open position and automatically uncovers the opening on the load lug assembly when the shutter plate is in the closed position.

3. The shutter assembly of claim 1, further comprising a slide cover disposed on the shutter housing and the shutter plate, the slide cover including openings therein that substantially align with the openings in the shutter housing to provide access to the conductors in the panelboard.

4. The shutter assembly of claim 3, further comprising a neutral lug assembly disposed on the slide cover, the neutral lug assembly having an opening through which a neutral lug may be accessed.

5. The shutter assembly of claim 1, further comprising a biasing mechanism coupled to the shutter plate, the biasing mechanism biasing the shutter plate in the closed position.

6. The shutter assembly of claim 1, wherein the shutter plate further includes a drive member protruding therefrom, the drive member interacting with a shutter actuator on a circuit breaker to slide the shutter plate from the closed position to the open position when the circuit breaker is inserted in the panelboard.

7. A panelboard for electrical distribution equipment, comprising:
   a breaker slot in the panelboard, the breaker slot providing access to conductors in the panelboard;
   a shutter assembly in the panelboard, the shutter assembly disposed over the breaker slot and movable between a closed position in which the shutter assembly blocks access to the conductors in the panelboard and an open position in which the shutter assembly allows access to the conductors in the panelboard, the shutter assembly including a shutter housing mountable to the panelboard in a breaker slot in the panelboard, the shutter housing including openings therein that allow access to the conductors in the panelboard when the shutter housing is mounted in the breaker slot in the panelboard; and
   a slide cover disposed on the shutter housing, the slide cover including openings therein that substantially align with the openings in the shutter housing to provide access to the conductors in the panelboard;
   wherein inserting a circuit breaker in the panelboard automatically puts the shutter assembly in the open position and removing the circuit breaker from the panelboard automatically puts the shutter assembly in the closed position.

8. The panelboard of claim 7, wherein the shutter assembly includes a shutter plate disposed within the shutter housing and slidable longitudinally within the shutter housing, the shutter plate including openings therein that are substantially aligned with the openings in the shutter housing to block access to the conductors in the panelboard when the shutter assembly is in the closed position, the openings in the shutter plate being offset from the openings in the shutter housing to provide access to the conductors in the panelboard when the shutter assembly is in the open position.

9. The panelboard of claim 8, further comprising a circuit breaker having a shutter actuator thereon, wherein the shutter plate further includes a drive member protruding therefrom, the drive member interacting with the shutter actuator on the circuit breaker to move the shutter assembly from the closed position to the open position when the circuit breaker is inserted in the panelboard.

10. The panelboard of claim 9, further comprising a neutral lug assembly on the shutter assembly, the neutral lug assembly having an opening through which a neutral lug may be accessed, wherein the circuit breaker includes an overhang that covers the opening on the neutral lug assembly when the circuit breaker is inserted in the panelboard.

11. The panelboard of claim 9, wherein the circuit breaker comprises a first neutral terminal protruding from underneath the circuit breaker and a second neutral terminal disposed under the overhang of the circuit breaker, the first and second neutral terminals being electrically connected via a wire internal to the circuit breaker.

12. The panelboard of claim 8, further comprising a load lug assembly having an opening through which a load lug may be accessed, wherein the shutter plate includes a load lug shield that automatically covers the opening on the load lug assembly when the shutter assembly is in the open position and automatically uncovers the opening on load the lug assembly when the shutter assembly is in the closed position.

13. The panelboard of claim 7, wherein the shutter assembly includes a biasing mechanism, the biasing mechanism biasing the shutter assembly in the closed position.

* * * * *